Oct. 25, 1960

O. E. KELM 2,957,362

DIE SINKING TABLE

Original Filed Nov. 12, 1953

INVENTOR.
OTTO E. KELM
BY
Woodhams Blanchard & Flynn
ATTORNEYS

Oct. 25, 1960

O. E. KELM 2,957,362

DIE SINKING TABLE

Original Filed Nov. 12, 1953

INVENTOR.
OTTO E. KELM
BY
Woodhams Blanchard and Flynn
ATTORNEYS

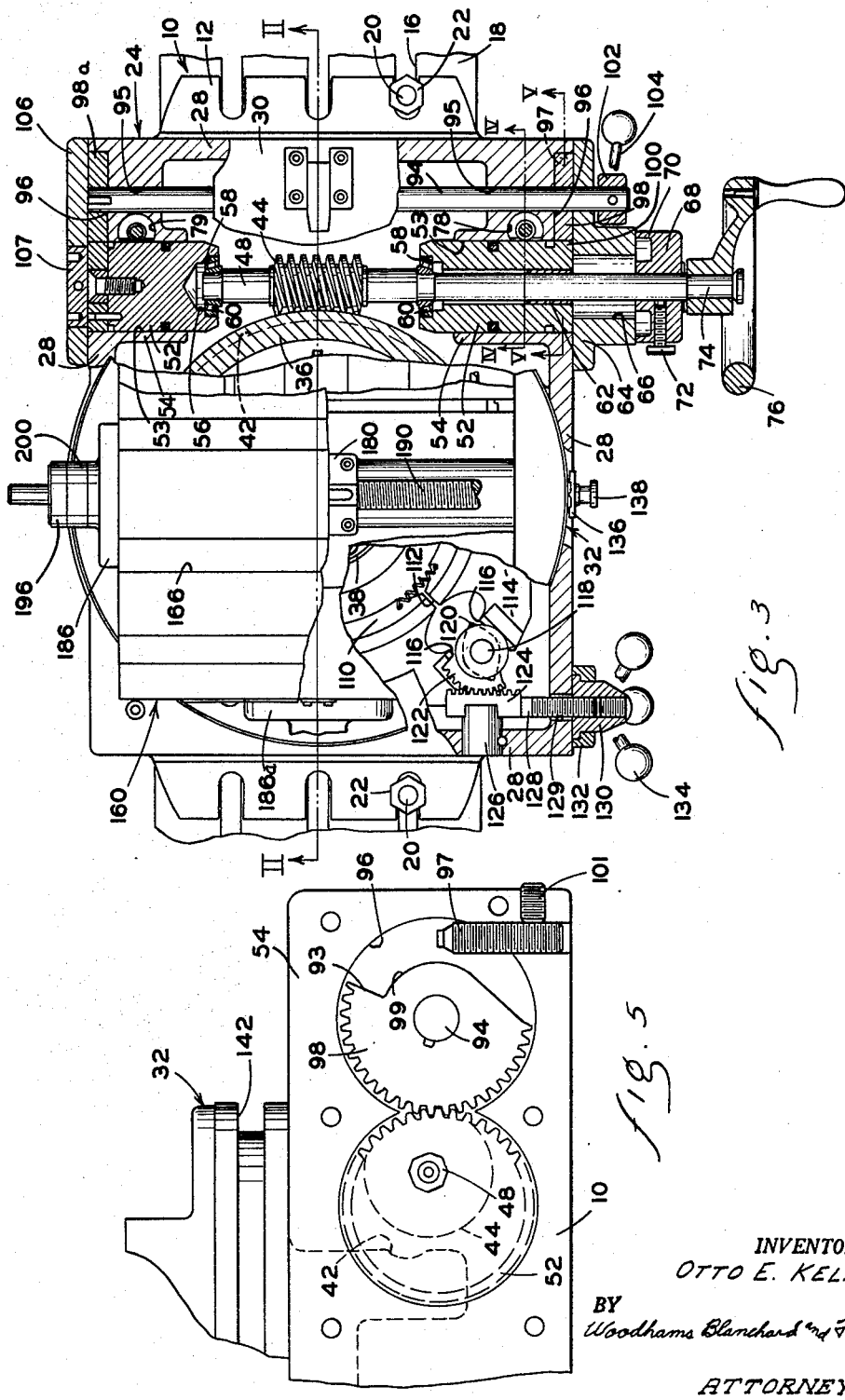

United States Patent Office 2,957,362
Patented Oct. 25, 1960

2,957,362

DIE SINKING TABLE

Otto E. Kelm, Coloma, Mich., assignor to Advance Products Corporation, Benton Harbor, Mich., a corporation of Michigan Continuation of application Ser. No. 391,466, Nov. 12, 1953. This application Oct. 18, 1957, Ser. No. 690,963

3 Claims. (Cl. 74—405)

This invention relates to a work positioning and holding device for use with a machine tool and it relates particularly to micrometric adjustment structure in said device which can be engaged and disengaged from driving relationship while maintaining an extremely high degree of precision when in driving position. This application is a continuation of Serial Number 391,466, filed on November 12, 1953, and now abandoned, and entitled "Die Sinking Table."

In the manufacture of dies or molds from metal, it is necessary that a high degree of accuracy be practiced in order that the contours of the die and its dimensions shall be precise and in accordance with specifications. The formation of dies and molds requires that many types of cuts be taken upon the block from which the die is being made. In most instances this requires the transfer of the workpiece from machine to machine or from one location upon the work table of a machine to another location thereon, in order to bring the cutting tool of the machine into proper orientation with the block from which the die is being formed. A small proportion of shops are equipped with special very expensive machines which make possible the manipulation of the cutting tool of the machine with respect to the workpiece. The rotary head milling machine built by Kearney and Treacker of Milwaukee, Wisconsin, is a machine of this character.

Because of the high cost of the special machines which offer such adjustment possibilities, most die sinking establishments must rely upon the use of a less expensive and less versatile machine tool, such as a vertical milling machine which is standard equipment in most shops, to accomplish the same result. Where such a machine is used for die making, it is often necessary to move the workpiece several times with respect to the machine during the machining operation, and then reorient said workpiece with requisite accuracy at each location, which consumes a great deal of time. Thus, in a small shop which is not equipped with adjustable machinery to effect relative orientation of the work with respect to a cutter without requiring dismantling of the workpiece from the machine, a very high proportion of the cost of making a die is involved in the non-productive work of transferring the workpiece. Consequently, small die shops are placed at a substantial disadvantage in competing with larger shops having the special equipment, in addition to which the possibility of error or spoilage of the work is increased greatly because of, and in substantially direct proportion to, the number of times the workpiece must be physically removed from, or moved around, the machine.

A further problem in the design of work positioning devices of the general type here dealt with lies in the provision of release mechanism whereby the work positioning structure of the device can be rotated freely when desired in addition to being rotatable under the influence of a micrometrically arranged worm. Previous designs have recognized this problem and have endeavored to solve it by providing eccentrically mounted means for supporting the worm and moving it when desired away from engagement with a worm wheel on the positioning means. However, this apparatus, without more, has in the past led to inaccuracies and/or binding of the worm and worm wheel. The inaccuracies have previously been believed to exist merely in unremovable tolerances existing in the apparatus as a whole and, accordingly, it was believed that the only way to improve the accuracy of the device was to limit still further the tolerances under which it was manufactured. However, my investigations have shown that a portion of such inaccuracies arose from the inability of previous mechanisms to move the worm into precisely the proper relationship with the worm wheel during successive operations of said mechanisms, and hence there was either permitted a slight backlash of varying amounts or an undesirable binding between the worm and worm wheel.

To overcome this defect, I have provided an extremely simple and effective mechanism by which the movement of the worm toward the worm wheel is precisely controllable by means which always insures engagement of the worm with the worm wheel in exactly the same relationship each time such engagement is made. Further, this control means has been made adjustable so that as the worm and worm wheel wear, suitable compensation for such wear can be made so that both backlash and binding between the parts can be prevented. In this way the accuracy of the over-all work positioning device has been greatly increased without providing the worm and worm wheel connections and release mechanism therefor with the extremely accurate and costly tolerances which would otherwise be required to produce the same results.

It is the primary object of this invention to provide a simple and comparatively inexpensive device which may be applied to a conventional machine tool, such as a vertical milling machine, to make possible the mounting of a workpiece upon that machine for substantially universal movement under a high degree of accuracy so that a workpiece may be adjusted in any of a number of directions with reference to a cutter without requiring dismantling of the workpiece from the machine tool.

A further object is to provide a device of this character having a base and a member rotatable on that base and adapted to be advanced rotatively by drive means operating substantially micrometrically, which drive means are characterized by mechanism for throwing the same out of engagement with the rotatable member so that the rotatable member may be turned to any extent desired by direct manual rotation, without resort to rotation of the worm or hand wheel attached thereto, to facilitate the positioning of a workpiece mounted upon said rotatable member, but without sacrificing the micrometric adjustment desired for high accuracy of machining operations.

A further object of this invention is to provide brake means in association with a rotatable member so constructed as to lock the rotating member at any selected position, and also to minimize the normal chatter and shaking which occur when existing machines make certain types of cuts in metal, such as "climbing cuts."

A further object of this invention is the provision of a device, as aforesaid, having mechanism to reduce, and compensate for, wear in the drive means for the rotatable member, and having structure whereby the position indicators, on those members of the device which move to position the work piece, can be easily observed at all times.

Other objects will be apparent from the following specification.

In the drawings:

Figure 3 is a top view of the device with parts broken away and illustrated in section.

Figure 4 is a detail sectional view taken on line IV—IV of Figure 3.

Figure 5 is a sectional view taken along the line V—V of Figure 3.

Figure 1:
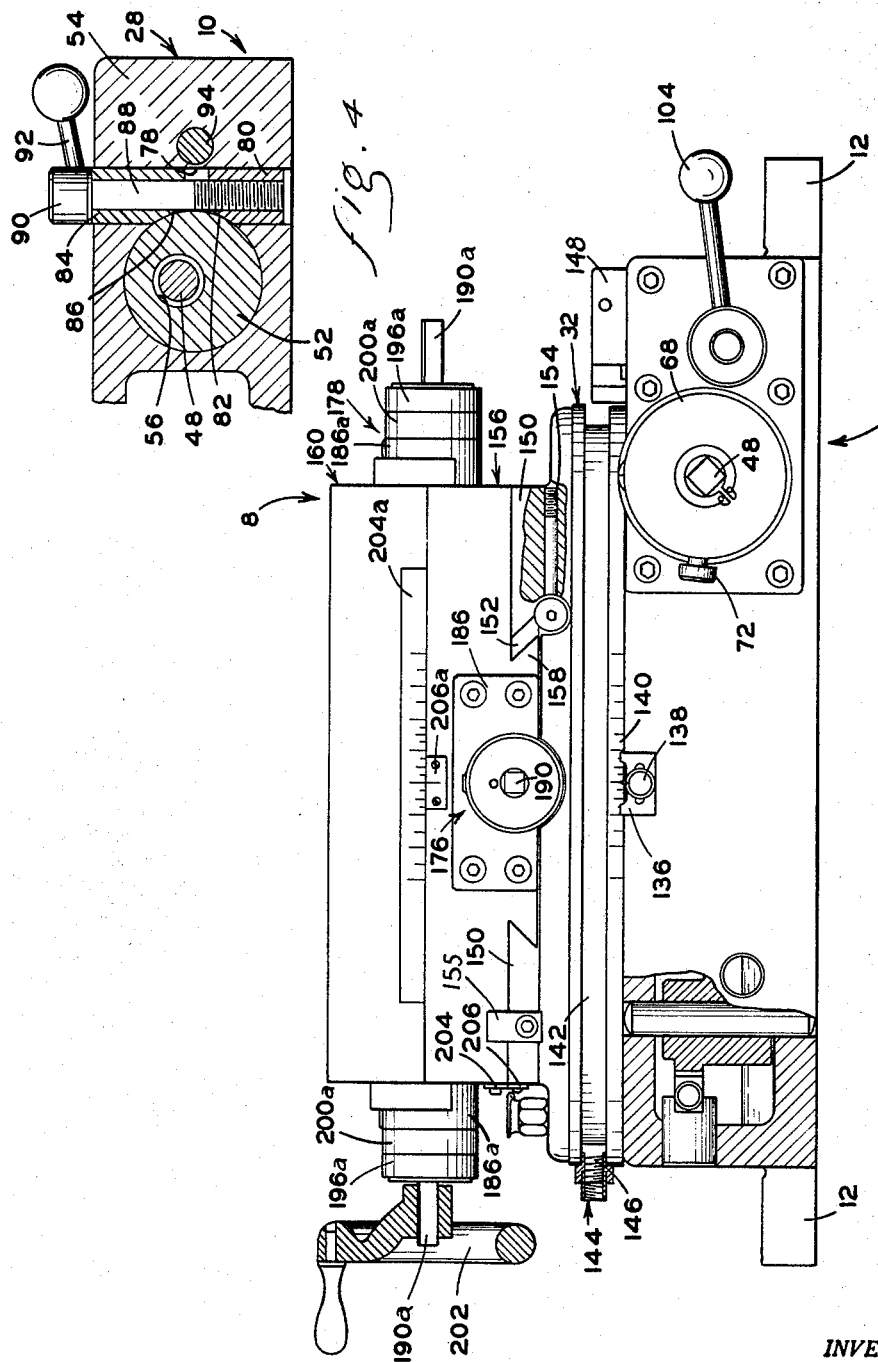
Figure 1 is a front view of the device with parts broken away.
Figure 2:
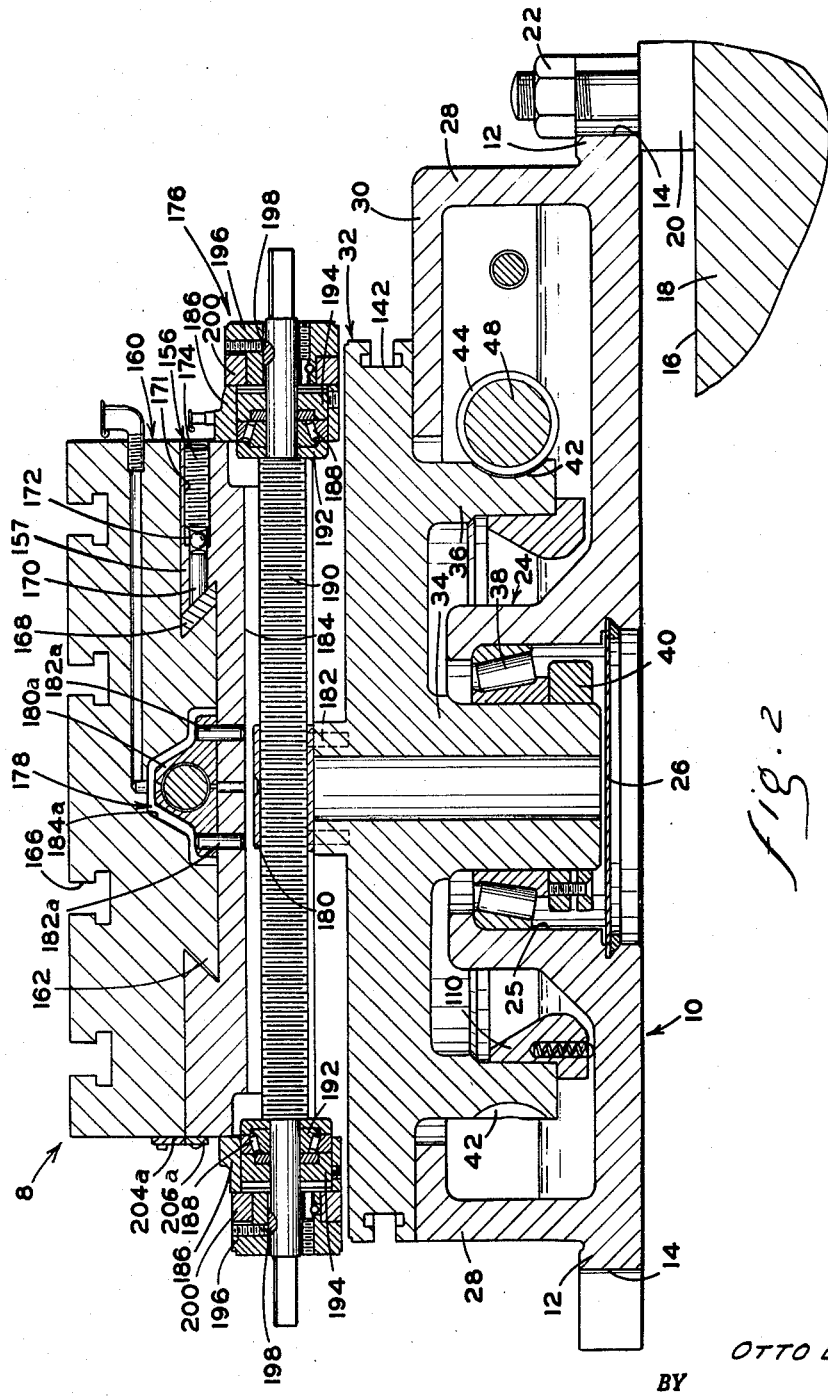
Figure 2 is a vertical sectional view taken on line II—II of Figure 3.

For convenience in description, the terms "upper," "lower" and derivatives thereof will have reference to the device of the invention in its normal position of operation, as appearing in Figures 1 and 2. The term "front" shall have reference to that side of the device shown in Figure 1.

Referring to Figures 1 and 2 in the drawings, which illustrate a work positioning device 8 embodying the invention, the numeral 10 designates a base member which is provided with flanges 12 and which is slotted as at 14 to accommodate or register with the ways of grooves 16 (Figure 3) upon the table 18 of a conventional vertical milling machine of the type having a vertical machine spindle (not shown) adapted to carry a cutting tool (not shown). The base member 10 is adapted to be bolted or otherwise anchored to the table 18 as by means of bolts 20 having T-shaped heads adapted to be received in the T-shaped ways or grooves 16 of the table 18. Said bolts 20 have mounting nuts 22 which clamp the flanges 12 in fixed relation with the table 18.

The base member 10 (Figure 2) has a central upwardly projecting and integral cylindrical portion 24 outlining a coaxial, cylindrical opening 25, which is adapted to be releasably closed by a bottom closure plate 26. Upright walls 28 are provided at the front, back and two sides of said base 10 and terminate in an inwardly directed top flange or plate portion 30 having a central opening substantially concentric with the cylindrical portion 24. A circular rotatable disk member 32 has a marginal portion whose lower surface bears slidably upon the top surface of the plate 30 on the base member. The disk 32 has a central depending hub 34 which extends into the opening 25 and whose outer diameter is smaller than the diameter of said opening 25. A cylindrical downwardly projecting flange 36 is carried by the disk 32 between, and concentric with, the hub 34 and wall of the aperture in the top plate 30. A bearing member 38 of any suitable character, here shown as a roller bearing, fits within the cylindrical opening 25 of the base to journal and center the hub 34 of the rotatable member 32 therein. The lower end portion of the hub 34 is preferably screw-threaded and an adjusting or locking nut 40 is threaded thereon to retain the rotatable member 32 in operative assembled relation to the base member.

The depending flange 36 (Figure 2) of the disk 32 has gear teeth 42 cut in its outer periphery to constitute a worm gear. A worm 44 (Figure 3) is preferably integral with the worm shaft 48. Front and rear cylindrical journal members 52 are journaled in cylindrical bores 53 in the flange or thickened portions 54 of the vertical walls 28 of the base member. Each of the journal members 52 has a bore 56 therein, which is located eccentrically thereof and adapted to receive a portion of the shaft 48. The confronting ends of the journal members 52 have counterbores 58 which receive bearings 60, such as roller bearings, serving to journal the shaft 48 within the members 52. The front journal member 52 will preferably have a worm shaft bearing sleeve 62 cooperating with the bearing 60 to journal the shaft 48 which extends completely and loosely through the bore 56 of the front member 52.

A front cap or plate 64 is secured to the front wall 28 in line with the front member 52 and serves to hold said front member 52 against displacement. The plate 64 has a hub portion having a large cylindrical passage 66 therein of a diameter substantially greater than the diameter of the shaft 48, for purposes to be mentioned. The shaft 48 passes through the opening 66 to project forwardly of the plate 64. A graduated collar 68 having a bearing sleeve 70 thereon is anchored on the shaft 48 by means of a thumb screw 72. The shaft 48 has a squared end portion 74, projecting frontwardly from the graduated micrometer collar 68, upon which a hand wheel 76 or other drive means may be mounted to rotate the shaft 48.

The wall portions 54 (Figure 3) of the base member have vertical bores 78 and 79 formed therein which are in partially intersecting relation to the horizontal bores 53 which receive the eccentric cylindrical members 52, as best seen in Figure 4. Each of the bores 78 and 79 has a locking nut 80 mounted in the lower part thereof and provided with a tapered or beveled surface 82 adapted to engage a portion of the surface of the adjacent cylindrical member 52. A bushing 84 is mounted in the upper portion of the bore 78 and it likewise has a tapered surface 86 adapted to engage the surface of the member 52. A screw-threaded member 88 passes slidably through the bushing 84 for screw-threaded engagement with the nut 80. The member 88 projects above the top plate 30 of the base member, as does the bushing 84, and a hub portion 90 of a lever 92 is secured upon the upper end of the member 88 and is adapted to bear against the top surface of the bushing 84. Rotation of the member 88 in one direction will serve to draw the bushing 84 and the screw-threaded nut 80 toward each other so that their surfaces 82 and 86 will be urged into firm clamping engagement with adjacent member 52, thereby serving to lock that member against rotation in its bore 53.

A horizontal shaft 94 (Figure 3) extends substantially parallel with and alongside the shaft 48, being journaled in openings 95 formed in the wall portions 54 of the base. The front and rear surfaces of the wall portions 54 are provided with counterbored sockets 96 around the openings 95, and gear sectors 98 and 98a, which are pinned or otherwise secured to the shaft 94, fit in the sockets 96. The cylindrical members 52 have gear teeth 100 cut in the ends thereof with which the teeth of the gear sectors 98 and 98a mesh. The gear sector 98 (Figure 5) has a radially disposed surface 93 adjacent to its periphery and at the counterclockwise end of a circumferentially elongated and arcuate recess 99 in said periphery. An adjustment screw 97, which extends upwardly through, and is threadedly engaged by, a threaded opening in the wall portion 54, engages at its upper end the surface 93 on the gear sector 98 to adjustably limit the clockwise rotation of said sector, as appearing in Figure 5. A set screw 101 releasably holds the adjustment screw 97, as desired. Engagement of the worm 44 with the worm gear 42 is controlled by engagement between the surface 93 and the adjustment screw 97.

The shaft 94 projects forwardly from the base member through an aperture in the front plate 64 and mounts a hub 102 of an operating lever 104 by means of which the shaft 94 may be rotated. A rear closure plate 106 is mounted on the rear wall 28 and serves as a retainer to confine the rear member 52 and the rear sector gear 98a in operative relation to the base member. A plug 107 is threaded in plate 106 to take up the end play of the rear member 52.

A brake shoe 110 (Figures 2 and 3), which is split at 112, fits within the depending cylindrical flange 36 and has projecting ear portions 114 at its opposite ends passing beneath the cylindrical flange 36 to project outwardly thereof and define cam engaging faces 116. A cam pivot pin 118 is carried by the base member and is positioned between the cam faces 116 to mount a cam member 120. The cam member 120 depends from a gear segment 122 which is adapted to mesh with a rack member 124 confined and positioned in a rack guide 126 carried by the adjacent side wall 28 of the base member. The rack has a screw-threaded shaft 128 secured thereto and slidably extending through an appropriate opening 129 in the front wall 28. A hub portion 130 is threadedly engaged with the end of said shaft projecting forwardly from the front wall 28, and said hub 130 is rotatably held against axial movement by a retainer 132. A hand wheel 134 is carried by the hub 130 and serves to move the shaft 128 axially and thereby pivot the rack 124 about the pin 118. This moves the cam 120 for the purpose of spreading the cam faces 116 on the split brake shoe 110 to expand and contract the same relative to the cylindrical part 36 of the rotatable member 32. In other words, by rotating the hand wheel 134 in a direction to cause the cam 120 to spread the cam faces 116 of the brake shoe 110, the brake shoe 110 is expanded into making frictional engagement with the inner surface of the cylindrical flange 36 so as to positively and firmly brake and hold the member 32 against rotative movement. Reverse rotation of the hand wheel 134 serves to release the braking action preparatory to operation of the hand wheel 76 for the purpose of rotating the worm 44 and the gear 42 so as to rotate the rotatable member 32.

A pointer plate 136 (Figure 1), having an adjustment knob 138 associated therewith, is carried by the base member 10 in a position to extend alongside the lower peripheral portion of the rotatable member 32. This member 32 is provided with a graduated scale 140 on its periphery for accurate measurement of the angular displacement of the member 32 from a zero setting. The periphery of the member 32 is preferably grooved at 142 as by means of a T-slot, as best seen in Figure 2, within which an adjustable rotation stop member 144 may be anchored at any selected position by means of the screw 146. The top plate 30 of the base member may mount a block 148 adjacent the periphery of the member 32 and extending into the path of the member 144 so as to limit the rotative movement of the rotatable member if desired. It will be understood that the parts 144 and 148 are optional.

A pair of spaced slide guides 150 (Figure 1), having undercut opposing faces, are fixedly carried by the rotatable member 32 at the top thereof. An intermediate cross-slide member 156 bears upon the members 150 and has an integral and elongated dovetail 158 on its lower side which is in interlocking engagement with said guides 150. A top cross-slide member 160 (Figure 2) is mounted slidably upon the intermediate slide member 156 and has a dovetail 162 arranged in interlocking engagement with the guides 157 on said member 156. Said dovetail 162 extends horizontally and perpendicularly to the dovetail 158. The top slide member 160 will preferably be provided with T-slots 166 of the character well understood in the art to accommodate anchorage of work pieces thereon by the use of bolts having T-shaped heads. A stop 155 is mounted on the rotatable member 32 and is engageable with intermediate cross-slide member 156 to limit movement thereof. The stop 155 may be moved out of the way by loosening the bolt which holds same on member 22 and then rotating same sidewardly. Alternatively, the stop may be entirely removed from member 32.

A gib 152 (Figure 1) is disposed between the dovetail 158 and one of the slide guides 150, and a gib adjusting screw 154 operates on the gib to control the sliding tolerances or lock the slide in a conventional manner. A gib member 168 (Figure 2) is interposed between the dovetail 162 and one of the slide guides 157 on the intermediate slide member 156. Said gib 168 is engaged by one end of a locking thrust shoe 170 slidably disposed in a bore in the member 156 and in turn engaged by an equalizing ball 172 within the lock-receiving bore 171, which ball in turn is pressed upon by the slide lock screw 174 screw-threaded in said bore 171.

The adjusting mechanism 176 between the intermediate slide member 156 and the rotatable member 32 is substantially the same as the adjusting mechanism 178 between the top slide 160 and the intermediate slide 156. Thus, parts of the adjusting mechanism 178 (Figures 1 and 2) will be identified by the same reference numerals as corresponding parts in mechanism 176, in addition to the suffix "a."

A feed nut 180 is mounted on each of the rotatable member 32 and the intermediate slide 156, the same being displaced 90 degrees with respect to their axes, and preferably being held accurately in that position by means of dowels 182 or like securing and positioning members. Each of the intermediate slide and the top slide is recessed at 184 to provide clearance for the associated feed nut. End caps or plates 186 are secured to the slide members 156 and 160 to span and partially close the passages 184 thereof. Each of the end caps 186 mounts a bearing 188 which journals the reduced end portion of a cross feed screw 190. A grease retaining washer 192 bears against the shoulder at the end of the cross feed screw 190 and against the bearing 188 at one side of that bearing. At the other side of that bearing a bearing adjusting nut 194 is screw-threaded into the plate 186. Hand knobs 196 are keyed at 198 to both ends of the feed screw 190, and the knobs 196 have micrometer collars 200 mounted thereon. A hand wheel 202 may be mounted upon one end of the screw 190.

The two slides 156 and 160 (Figure 1) support scale members 204 and 204a, respectively, which are adapted to be read in correlation with pointer plates 206 and 206a mounted upon the slide 156 and disk member 32, respectively. Thus, the pointer plate 206a, which is read in association with the scale 204a upon the top slide 160, is mounted upon the intermediate slide 156, while the pointer plate 206, which is adapted to be read in association with the scale 204 on the intermediate slide 156, is mounted upon the guide 150 which is carried by the rotatable member 32.

In the use of the device the base member is mounted upon means, such as a movable table 18 of a conventional vertical milling machine having a vertical machine spindle (not shown). The device will preferably be so mounted that the rotatable member 32 will be axially aligned with the machine spindle. Likewise, the cross slide members 156 and 160 will preferably be centered, that is, will be located at their respectvie zero positions, as indicated upon the scales 204 and 204a and the micrometer scale collars 200 and 200a. The rotatable member 32 will be set at zero as indicated by the angle measuring scale 140, and upon the graduated micrometer collar 68 of the worm shaft 48. In other words, the complete unit is precisely and centrally located in relation to the spindle of the machine tool, and all dials of that machine tool will preferably be set at zero. A work piece is then mounted and located upon the top slide 160 in a conventional manner using the T-slots 166 provided in the top slide as means for anchorage of clamping members having T-shaped heads fitting in those slots.

As an aid in manipulating the clamping means, and particularly to facilitate rotation of the device during location of the work piece relative to a cutter, it may be desired to release the rotatable member 32 for free rotation. That operation can be accomplished simply and rapidly by manipulating the levers 92 in a direction to release the clamping pressure of the bushings 84 and the nuts 80 upon the eccentric cylinders 52. When that clamping action has been released, the lever 104 may be swung through an arc to rotate the gear sectors 98 which mesh with the gear teeth 100 on the eccentric members 52 and rotate those eccentric members in such a manner as to swing the worm shaft 48 bodily from the position shown in Figure 4 to a position in which the worm 44 disengages the gear 42 on the rotatable member 32. Thereupon, the member 32 and the parts carried thereby may be rotated freely as the work piece is secured to the top slide.

When the work piece has been properly secured in place, the rotatable member is returned to its zero position, and the lever 104 (Figure 3) is moved to rotate the shaft 94 in a counterclockwise direction as appearing in Figure 5, whereby the gear sectors 98 and 98a are also rotated counterclockwise. This results in a clockwise rotation of the journal members 52 which, due to the eccentric support of the worm 44 by said journal members, causes the worm to move toward the worm gear 42 until the surface 93 on gear sector 98 engages the adjustment screw 97, at which point the worm will normally engage the worm gear. It there is a binding between the worm 44 and the gear 42 the set screw 101 is loosened and the adjustment screw 97 is moved upwardly against the surface 93, thereby increasing the center line distance between the worm and worm gear until the binding is relieved. If the engagement between the worm 44 and gear 42 becomes loose as a result of wear, for example, thereby produicng backlash, the adjustment screw is lowered, which produces a reduction in the centerline distance between the worm and worm gear. In both instances, the adjustments can be made precisely and accurately in extremely small increments and at any time that such adjustments appear to be desired or required.

After the worm 44 has been reengaged with the worm gear, the members 52 are locked in operative position by moving the levers 92 to cause firm frictional locking engagement of the members 52 by the locking bushings 84 and the locking nuts 80. Thereafter, as any rotative adjustment is desired in the position of the member 32, it can be effected by operation of the hand wheel 76 and can be controlled with micrometric accuracy through the angle scale 140 and the micrometer scale 68.

Once a desired rotative position of the member 32 has been set, the member 32 can be locked in that setting by turning the hand wheel 134. This rotates the shaft 128 for the purposes of advancing the rack 124 in its guide 126 and thereby swinging the gear segment 122 having the cam 120 associated therewith. The rotative movement of the cam 120 acting against the surfaces 116 on the ears 114 of the brake shoe 110 serves to expand that brake shoe into firm frictional engagement with the inner surface of the flange 36 on the rotatable member. Consequently, through the use of this brake no possible rotation of the member 32 can occur. Furthermore, this brake serves as an additional means to steady the rotatable member relative to the base and its mounting and to avoid the occurrence of chattering and vibration incident to the taking of a heavy cut or a particular type of cut, such as a "climbing cut," in which chattering and vibration are most commonly experienced. As used herein, the term "climbing cut" means a cut made by feeding work with respect to a rotating cutter in the same direction as the peripheral movement of the cutter adjacent to the work.

In addition to the rotative adjustment, the work piece may be adjusted relative to the cutting tool on the machine spindle by the cross slide members 156 and 160. Furthermore, if the table 18 of the machine tool, such as a mill upon which this mechanism is mounted, is adjustable, the moving of that table 18 affords a further adjustment of the work piece. It will be evident that the adjustments of the slides 156 and 160 may be accomplished with micrometric accuracy by observing the scales 204 and 204a and also the micrometer collars 200 and 200a. Thus the position of the work piece with relation to the machine spindle may be altered through a wide range of movements without requiring disconnection of the work piece from the top slide member 160 and, particularly, without relocating the device of the invention with respect to the table 18. Obviously, the various movements of the parts, that is, the rotation of the member 32 and the movement of either of the slides 156 and 160, may occur while a cut is being taken by a machine tool and thus accurate guidance of intricate cutting of contours may be accomplished. Alternatively, the adjustment may be effected while the cutting tool is out of engagement with the work, as in instances where holes are to be drilled at selected points or other special cuts are to be taken at predetermined points spaced from previous cuts.

The device is characterized by ease and accuracy of manipulation and measurement, simplicity of use, sturdiness and firm location of parts, locking against vibration or chattering in use, and ready maneuvering or rotation to facilitate connection or disconnection of a work piece. With reference to avoidance of chatter, attention is directed to the provision of a gib adjusting means which insures freedom of movement while preventing play at the dovetailed joints between the relatively slidable members, and which acts further as means to permit positive locking of the slides to each other and to the rotatable member at a selected position while a machining operation is being performed.

While the preferred embodiment of the invention has been illustrated and described, it will be understood that changes in the construction may be made within the scope of the appended claims without departing from the spirit of the invention.

I claim:

1. In a rotary, work-supporting table structure including a base, a table rotatably mounted on said base, a work wheel coaxially secured to said table, a worm rotatably supported in eccentric openings in journals so that said worm can be moved into or out of engagement with said worm wheel by rotation of said journals, the combination with said table structure of mechanism for effecting rotation of said journals and for locating same in a precisely adjustable position when said worm and said worm wheel are in engagement which comprises gear teeth on said journals arranged concentric with the axis thereof; a gear engaged with the gear teeth on each of said journals and means for effecting simultaneous rotation of said gears, at least one of said gears being a sector gear, said sector gear having a substantially radially disposed stop surface adjacent the periphery thereof; adjustable stop means mounted in said base for engaging said stop surface to prevent rotation of said gears in one direction and thereby prevent rotation of said journals in one direction when said worm engages said worm wheel, whereby said worm and said worm wheel can be repetitively engaged in the same relationship with each other; and locking members supported within said base respectively adjacent to said journals, said locking members being releasably engageable with said journals for selectively preventing rotation thereof.

2. The structure of claim 1 wherein said gears are mounted upon a shaft parallel with the rotational axis of said journals, and wherein said stop means is comprised of a screw threadedly disposed in said base for movement along and around an axis substantially perpendicular to said stop surface when said worm is in engagement with said worm wheel.

3. The structure of claim 1 wherein said gears are mounted upon a shaft parallel with the rotational axis of said journals; wherein said locking members comprise a pair of spaced sleeves disposed in said base for axial movement along a common axis substantially perpendicular to a plane defined by the axes of said worm and said journals, said sleeves being on opposite sides of said plane and engageable at their adjacent ends with one journal; and wherein there is included a manually controllable screw extending through said sleeves, for moving said sleeves toward and away from said one journal.

References Cited in the file of this patent

UNITED STATES PATENTS

| | | |
|---|---|---|
| 1,105,377 | Robinson | July 28, 1914 |
| 1,162,048 | Freeman | Nov. 30, 1915 |
| 1,410,442 | Amendt | Mar. 21, 1922 |
| 2,068,679 | Hokansson | Jan. 26, 1937 |
| 2,119,029 | Senger | May 31, 1938 |
| 2,135,639 | | |
| 2,148,779 | | |
| 2,588,560 | | |
| 2,748,624 | | |
| 2,771,169 | | |
| 2,819,654 | | |

| | | |
|---|---|---|
| 2,135,639 | Gorham | Nov. 8, 1938 |
| 2,148,779 | Senger | Feb. 28, 1939 |
| 2,588,560 | Nicolls | Mar. 11, 1952 |
| 2,748,624 | Costello | June 5, 1956 |
| 2,771,169 | Wahlstrom | Nov. 20, 1956 |
| 2,819,654 | Coy | Jan. 14, 1958 |

FOREIGN PATENTS

| | | |
|---|---|---|
| 4,363 | Great Britain | Feb. 22, 1909 |
| 353,992 | Italy | Nov. 6, 1937 |
| 508,193 | France | Oct. 4, 1920 |